Aug. 2, 1938.    W. G. L. SMITH    2,125,524
BRAKE BLOCK CONSTRUCTION
Filed Dec. 5, 1936
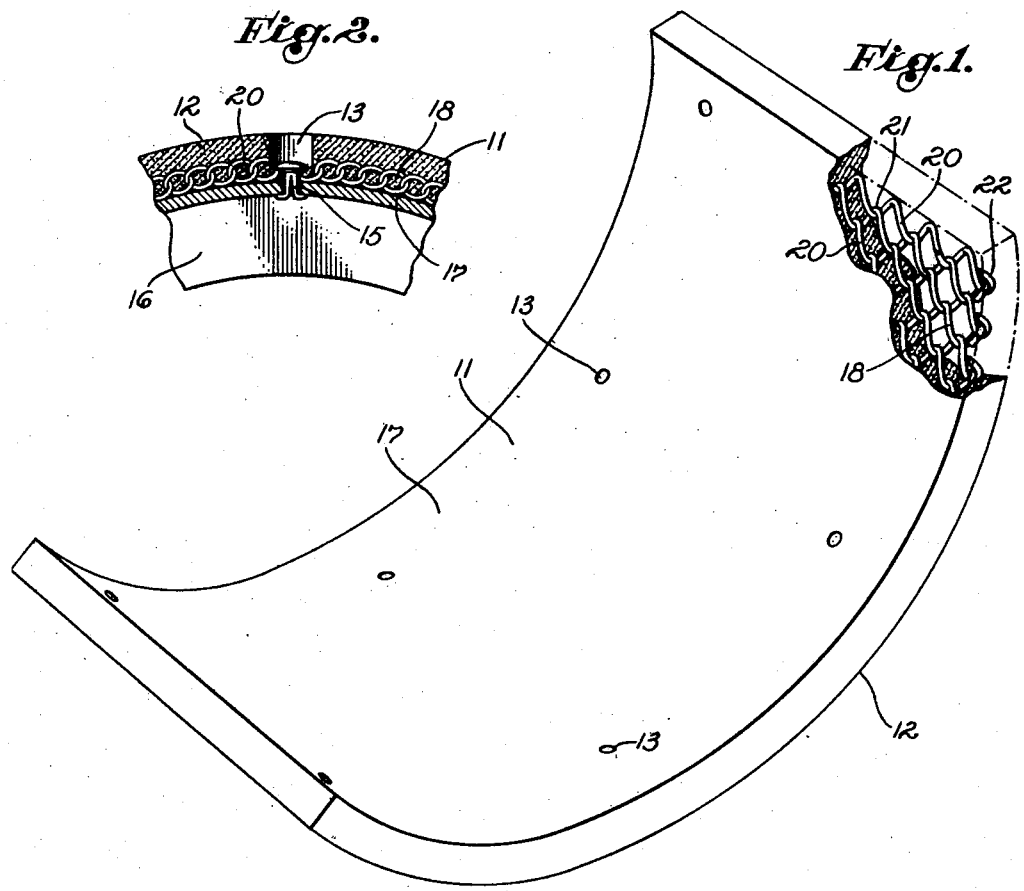
INVENTOR
WALTER G. L. SMITH
BY
Fred W. Lann
ATTORNEY.

Patented Aug. 2, 1938

2,125,524

UNITED STATES PATENT OFFICE 2,125,524

BRAKE BLOCK CONSTRUCTION

Walter G. L. Smith, Los Angeles, Calif.

Application December 5, 1936, Serial No. 114,382

6 Claims. (Cl. 188—251)

My invention relates to friction brake lining, and more particularly to the type of lining used in connection with heavy duty brake shoes for trucks, busses, and other types of heavy vehicles, as well as various kinds of stationary machinery, such as oil well equipment, etc.

Brake shoes of vehicles and machinery of the types indicated above usually are lined with friction blocks which are pre-formed and of rigid construction. Brake blocks of this kind are usually formed of molded material and are intended to exactly fit the curvature of the drum engaged thereby, to effect the braking action. Various attempts have been made to provide such brake blocks with reinforcing bases or backing, serving as a foundation binder for the molded material of the block. One type of base which has been used consists in a rigid metal plate having cored portions therein into which the material of the block is molded under pressure. Another type of binder used consists of woven metal, such as rigid heavy mesh wire screening material, which is molded into the base portion of the block. Other types of fabricated metal binding have also been used.

Considerable difficulty has always been encountered in preventing such molded brake blocks from warping during the curing process thereof. The compounded material ordinarily used for molding such blocks requires heat curing after being molded, and the material has a decided tendency to shrink during this curing process. I have found that the warping of brake blocks during the curing process is due to the relative expansion and contraction of the rigid metal binder and the material of the blocks. No difficulty is experienced with warping when blocks are molded without rigid metal binding members, but the binding members are desirable for reinforcing purposes, particularly to provide supports for the rivets or bolt heads which secure the blocks to the brake shoe.

My primary object of invention is to provide a metal base or foundation binder, molded in the body of a brake block, the metal binder being capable of limited expansion and contraction to accommodate itself to the expansion and contraction of the material of the block, so that warping of the block is prevented.

It is another object of my invention to provide a binder for the purpose indicated in the above paragraph which consists of interengaging elements capable of limited relative movement in transverse directions so that the binder accommodates itself to the expansion and contraction of the material of the block.

It is another object of my invention to provide, in combination with a brake block, a metal binding web molded into the body of the block, the binding web comprising a plurality of helical elements disposed side by side in interengaging relationship and capable of limited relative movement when the material of the body expands or contracts to prevent warping of the body.

The above objects of the invention will be apparent from the following description in connection with the accompanying drawing. In the drawing:

Fig. 1 is a perspective view of the brake block embodying the features of my invention, with a portion thereof broken away to show the metal binder molded therein.

Fig. 2 is a fragmentary section indicating the brake block of my invention secured to a brake shoe.

Fig. 3 is a fragmentary face view of the metal binding web of my invention, and

Fig. 4 is a fragmentary end elevation of the portion of the web shown in Fig. 3, this view being taken as indicated by the arrow 4 of Fig. 3.

Referring to the drawing, I show a rigid, molded brake block 11, which according to usual practice is preformed to fit the drum which the outer surface 12 of the block engages in accomplishing its braking action of the wheels of a vehicle or other rotating member. According to usual practice, a series of holes 13 are formed through the body of the block, the holes 13 being countersunk from the braking surface 12 to accommodate the head of a bolt or rivet, indicated at 15, which secures the block 11 to a brake shoe 16, a portion of which is shown in Fig. 2.

Molded into the body of the block 11, preferably adjacent the base surface 17 thereof so as to form a foundation for the molded material of the block, is a binder 18.

The binder 18 is preferably formed of metal wire and is fabricated to form a web capable of limited expansion and contraction both longitudinally and transversely of the block so that the binder may accommodate itself to expansion and contraction of the material of the block and will not tend to warp the block when shrinkage of the material thereof occurs during the curing process to which the block is subjected after being molded.

The binder web 18 is preferably formed of a plurality of interengaging elements capable of limited relative movement in transverse directions. One convenient form of metal binding web for accomplishing the function of my invention comprises a plurality of helical elements 20 having the respective convolutions 21 thereof interengaged, as by threading one element 20 into the other, as indicated in the drawing. In practice, I prefer to interlock the adjacent ends of the elements 20 on one side of the web 18, for instance, by crimping the adjacent ends together, as indicated at 22 in Fig. 3. The opposite ends of the elements 20 are preferably free, the crimped ends 22 serving to prevent relative displacement of the elements 20 before the binder is molded into the block.

It will be seen that the construction of the binder web 18 illustrated permits relative movement of the respective elements 20 in transverse direction; that is, it permits relative movement of the elements in the directions indicated by the double arrow 25, and also permits relative movement between the elements in the directions indicated by the double arrow 26. Likewise, as viewed in Fig. 4, the construction permits limited relative movement between the elements 20 in the transverse directions indicated by the double arrows 27 and 28. The web 18 shown is capable of considerable torsion; that is, the respective ends 29 and 30 of the web may be relatively twisted in opposite directions in planes perpendicular to the plane of the paper. It will be seen that the preferred form of fabricating the binder web just described permits both longitudinal expansion and contraction of the web in the directions indicated by the arrow 26 of Fig. 3, and transverse expansion and contraction in the directions indicated by the arrow 25 of Fig. 3.

In practice, when the binder web 18 is molded into the body of the brake block, as by placing the web in the bottom of a mold and compressing the material of the block therein under tremendous pressure, the material of the block is forced into the interstices between the respective elements 20, and the material of the block and the web 18 are formed to a desired contour, such as indicated in Fig. 1. After the brake blocks 11 are molded, they are subjected to a heat-treating process to cure the homogeneous mass of material into a substantially rigid block. With the construction of the binder web 18 embodying the features of my invention, as above described, the web accommodates itself to the inherent tendency of the material of the block 11 to shrink and does not subject the material of the block to any strains either in a longitudinal or transverse direction or to any torsional strain during the normal shrinkage of the material of the block, so that the material has no tendency to warp out of shape.

I have shown, for convenience in illustration, only one form of fabricated metal webbing for accomplishing the purpose of my invention, but it should be understood that I am aware of various other forms of fabricated metal webbing which might be utilized in combination in a molded brake block construction, all of which would come within the scope of my invention. The primary concept of my invention is the provision of a metal binder capable of expansion and contraction and capable of sufficient flexibility and torsion so that when such a binder is molded into a brake block the binder is capable of accommodating itself to the expansion or contraction of the material of the block. Therefore, the scope of the invention should be interpreted by the appended claims and not be limited to the illustrative form disclosed in the drawing and described in detail above.

I claim as my invention:

1. A brake block comprising: a body; and a metal binding web characterized by continuity of metal across one dimension of the web and discontinuity of metal across the transverse dimension, said web consisting of separate elements having loosely intermeshing portions capable of limited relative movement allowing longitudinal and transverse expansion and contraction of said web, said web being molded in said body whereby relative shrinkage of the material of said body and the metal of said binding web will not warp said body.

2. A brake block comprising: a body; and a metal binding web molded in said body, said web being characterized by continuity of a metal across one dimension of the web and discontinuity of metal across the transverse dimension, and consisting of individual intermeshing elements capable of limited relative movement, the web being capable of torsion whereby relative expansion and contraction of the materials of said body and said web will not warp said body.

3. A brake block comprising: a pre-formed molded body; and a metal binder molded therein characterized by continuity of metal in one direction and discontinuity of metal in the transverse direction and consisting of a plurality of elements having loosely interengaging portions capable of limited relative movement whereby expansion and contraction of the material of said body relative to said binder will not warp said body.

4. In a brake block of the character described, the combination of: a body of brake lining material; and a metal binding web imbedded therein, said web comprising a plurality of helical elements disposed side by side in interengaging relationship and capable of limited relative movement when the material of said body expands or contracts to prevent warping of said body.

5. In a brake block of the character described, the combination of: a body of brake lining material; and a series of individual, sinuously deformed, flexible reinforcing members embedded in said body in side-by-side disposition with loops of adjacent members of said series loosely passing through each other.

6. In a brake block of the character described, the combination of: a body of brake lining material; and a metal reinforcing web embedded in said body, said web being characterized by continuity of metal across one dimension and discontinuity across the transverse dimension and comprising flexible metal strands, said strands being sinuous in form for longitudinal extension and contraction in the dimension of continuous metal across the web and being interconnected loosely to permit movement relative to each other in the transverse direction across the web.

WALTER G. L. SMITH.